United States Patent
Kim et al.

(10) Patent No.: US 7,692,520 B2
(45) Date of Patent: Apr. 6, 2010

(54) SINGLE PACKAGE TELEVISION TUNING APPARATUS AND TELEVISION RECEIVER INCLUDING THE SAME

(75) Inventors: Byung Hyuk Kim, Gyunggi-Do (KR); Kyo Sang Lee, Seoul (KR); Young Hong Mun, Seoul (KR); Chang Ik Kim, Gyunggi-Do (KR); Young Ju Jang, Gyunggi-Do (KR)

(73) Assignee: Samsung Electro-Mechanics Co., Ltd., Suwon, Gyunggi-Do (KR)

( * ) Notice: Subject to any disclaimer, the term of this patent is extended or adjusted under 35 U.S.C. 154(b) by 494 days.

(21) Appl. No.: 11/750,195

(22) Filed: May 17, 2007

(65) Prior Publication Data
US 2007/0291182 A1    Dec. 20, 2007

(30) Foreign Application Priority Data
Jun. 14, 2006    (KR) ................ 10-2006-0053579
Mar. 6, 2007    (KR) ................ 10-2007-0022094

(51) Int. Cl.
*H03J 1/00*    (2006.01)
*H04Q 7/20*    (2006.01)
(52) U.S. Cl. .................. 334/85; 348/731; 455/301
(58) Field of Classification Search ............ 334/47, 334/85; 348/731; 455/301
See application file for complete search history.

(56) References Cited
U.S. PATENT DOCUMENTS
2006/0038924 A1 *    2/2006    Kitaguchi ........... 348/705

FOREIGN PATENT DOCUMENTS
JP    02-288513 A    11/1990
KR    10-2004-0099876 A    2/2004
KR    10-2004-0098094 A    11/2004

OTHER PUBLICATIONS
Korean Intellectual Property Office, Office Action mailed Dec. 13, 2007 and English Translation.
UK Intellectual Property Office Search Report mailed, Sep. 20, 2007 and English Translation.

* cited by examiner

*Primary Examiner*—Lee Nguyen
(74) *Attorney, Agent, or Firm*—Lowe Hauptman Ham & Berner

(57) ABSTRACT

There are provided a single package television tuning apparatus and a television receiver including the apparatus. The apparatus includes: a printed circuit board; a switching part installed on the printed circuit board and selecting one of a first radio frequency signal and a second radio frequency signal inputted; a tuner part installed on the printed circuit board and down-converting one of the first radio frequency signal and the second radio frequency signal, the one selected by the switching part; first and second input connectors receiving the first radio frequency signal and the second radio frequency signal; and a chassis supporting the first and second input connectors, covering the printed circuit board, the switching part, and the tuner part, and electrically connected to grounds of the switching part and the tuner part.

46 Claims, 7 Drawing Sheets

SINGLE PACKAGE TELEVISION TUNING APPARATUS AND TELEVISION RECEIVER INCLUDING THE SAME

CROSS-REFERENCE TO RELATED APPLICATIONS

This application claims the priorities of Korean Patent Applications No. 2006-0053579 and 2007-0022094 filed on Jun. 14, 2006 and Mar. 6, 2007, respectively, in the Korean Intellectual Property Office, the disclosures of which are incorporated herein by reference.

BACKGROUND OF THE INVENTION

1. Field of the Invention

The present invention relates to a television tuning apparatus employed by a television receiver such as a TV set-top box, and more particularly, to a single package television tuning apparatus including a switching part for selecting multi input and a tuner part installed together on one chassis and shielding the switching part form other elements to prevent a signal interference between the switching part and the other elements and to carry out size reduction and a low price and a television receiver including the apparatus.

2. Description of the Related Art

In general, as digital broadcasting has been provided, a television receiver selectively receiving general analog broadcasting and the digital broadcasting has been researched and developed. Also, as satellite broadcasting is started, a television receiver selectively receiving general terrestrial broadcasting and the satellite broadcasting has been researched and developed.

On the other hand, when a television receiver employed by such a TV set-top box receives an analog broadcasting signal and a digital broadcasting signal, the television receiver has to be manufactured to selectively receive one of the analog broadcasting signal and the digital broadcasting signal.

FIG. 1 is a configuration diagram illustrating a conventional television tuning apparatus 10. Referring to FIG. 1, the television tuning apparatus 10 includes a switching box 11 and a tuner 12. The switching box 11 and the tuner 12 are manufactured to be in individual chassis. Accordingly, the switching box 11 and the tuner 12 have to be connected to each other by an additional cable CA to mutually transmitting and receiving a signal.

The switching box 11 selects and transmits one of an analog broadcasting signal via a first input terminal ANT1 and a digital broadcasting signal via a second input terminal ANT2 to the tuner 12 via an output terminal OUT1 according to a switching signal Ssw.

The tuner 12 receives a signal selected by the switching box 11 via an input terminal IN. In this case, the signal is a radio frequency (RF) signal, which is one of the analog broadcasting signal and the digital broadcasting signal, corresponding to a selected channel. The tuner 12 converts the signal into an intermediate frequency (IF) signal and outputs the IF signal via an output terminal OUT2.

As described above, the switching box 11 and the tuner 12 have to be connected to each other by the additional cable CA after manufactured in the individual chassis.

However, since the switching box 11 and the tuner 12 are connected to each other by the additional cable in the general television tuning apparatus 10, there occurs a loss of a signal via the cable CA, thereby deteriorating quality of a broadcasting signal.

Also, since the switching box 11 and the tuner 12 are formed by individual chassis, manufacturing costs are high. When installing the switching box 11 and the tuner 12 on a television apparatus such as a TV set-tip box, since the switching box 11 and the tuner 12 occupy relatively a lot of area and volume, it is difficult to reduce size of the television apparatus.

SUMMARY OF THE INVENTION

An aspect of the present invention provides a single package television tuning apparatus including a switching part for selecting multi input and a tuner part installed together on one chassis and shielding the switching part form other elements to prevent a signal interference between the switching part and the other elements and to carry out size reduction and a low price and a television receiver including the apparatus.

According to an aspect of the present invention, there is provided a single package television tuning apparatus including: a printed circuit board (PCB); a switching part installed on the PCB and selecting one of a first RF signal and a second RF signal inputted; a tuner part installed on the PCB and down-converting one of the first RF signal and the second RF signal, the one selected by the switching part; first and second input connectors receiving the first RF signal and the second RF signal; and a chassis supporting the first and second input connectors, covering the PCB, the switching part, and the tuner part, and electrically connected to grounds of the switching part and the tuner part.

The apparatus may further include a shielding wall connected to the chassis to shield the switching part from a signal interference with at least one element of other elements connected to the PCB.

The chassis may include: a body chassis coupled with the PCB and covering sides of the PCB to protect the sides of the PCB; a first cover chassis coupled with the body chassis and covering an exposed portion of a one surface of the PCB to protect the one surface of the PCB; and a second cover chassis coupled with the body chassis and covering an exposed portion of another surface of the PCB, the another surface opposite to the one surface, to protect the another surface of the PCB.

The switching part may be formed on the one surface of the PCB, and the tuner part may be formed together with the switching part on the one surface of the PCB.

The switching part may be formed on the one surface of the PCB, and the tuner part may be formed on the another surface of the PCB.

The apparatus may further include a switching terminal receiving and transmitting a switching signal to the switching part.

According to another aspect of the present invention, there is provided a single package television tuning apparatus including: a PCB; a switching part installed on the PCB and selecting one of a first RF signal and a second RF signal; a tuner part installed on the PCB and down-converting one of the first RF signal and the second RF signal, the one selected by the switching part; first and second input connectors receiving the first RF signal and the second RF signal; a chassis supporting the first and second input connectors, covering the PCB, the switching part, and the tuner part, and electrically connected to grounds of the switching part and the tuner part; a shielding wall connected to the chassis to shield the switching part from a signal interference with at least one element of other elements connected to the PCB; and a pin connector receiving an input selection signal for selecting one of the first RF signal and the second RF signal.

The pin connector may include: a power pin receiving and transferring a tuning operation power to the tuner part; a control data pin receiving and transferring control data including a channel selection signal and the input selection signal for selecting one of the first RF signal and the second RF signal, to the tuner part; and a signal output pin outputting a signal from the tuner part.

The tuner part may include: a data processor analyzing the channel selection signal and the input selection signal included in the control data received via the control data pin, outputting a channel control signal according to the channel selection signal, and transmitting a switching signal to the switching part according to the input selection signal; and a converter down-converting an RF signal from the switching part according to the channel control signal from the data processor.

The apparatus may further include a demodulating part demodulating the signal from the tuner part.

The demodulating part may include: an analog demodulator demodulating the first RF signal; and a digital demodulator demodulating the second RF signal, wherein the first RF signal is for analog broadcasting and the second RF signal is for digital broadcasting.

According to still another aspect of the present invention, there is provided a television receiver including: a power supply unit supplying a voltage for operation; a controller providing control data including a channel selection signal and an input selection signal; and a television tuning apparatus formed of one chassis, the apparatus receiving the voltage for operation from the power supply unit, and down-converting one of a first RF signal and a second RF signal according to the input selection signal included in the control data from the controller, wherein the apparatus comprises a PCB; a switching part installed on the PCB and selecting one of the first RF signal and the second RF signal inputted; a tuner part installed on the PCB and down-converting one of the first RF signal and the second RF signal, the one selected by the switching part; first and second input connectors receiving the first RF signal and the second RF signal; and a chassis supporting the first and second input connectors, covering the PCB, the switching part, and the tuner part, and electrically connected to grounds of the switching part and the tuner part.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
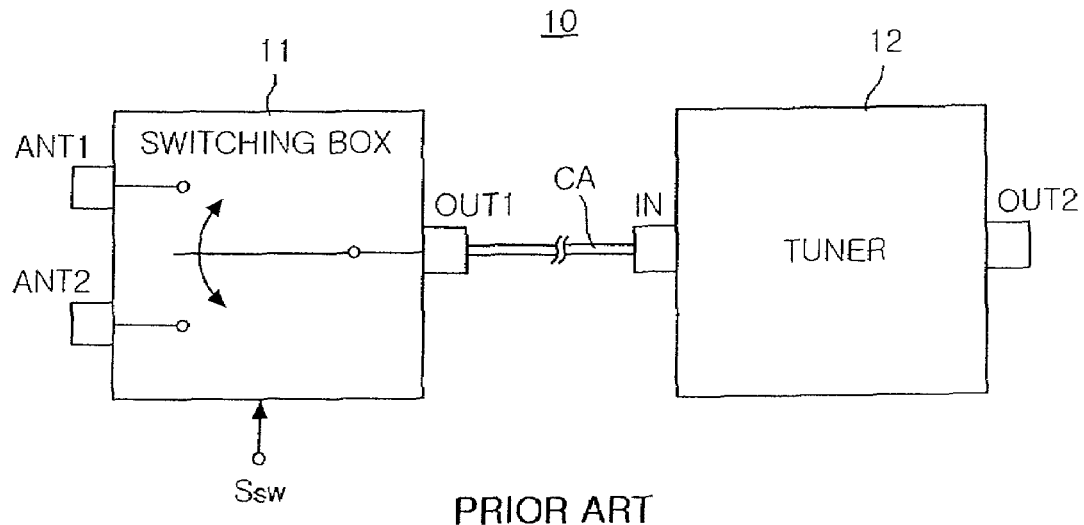
FIG. 1 is a configuration diagram illustrating a conventional television tuning apparatus.

Hereinafter, exemplary embodiments of the present invention will now be described in detail with reference to the accompanying drawings.

The present invention will not be limited to embodiments, and the embodiments of the present invention are used for understanding the technical scope of the present invention. Like reference numerals in the drawings denote like elements.

Figure 2:
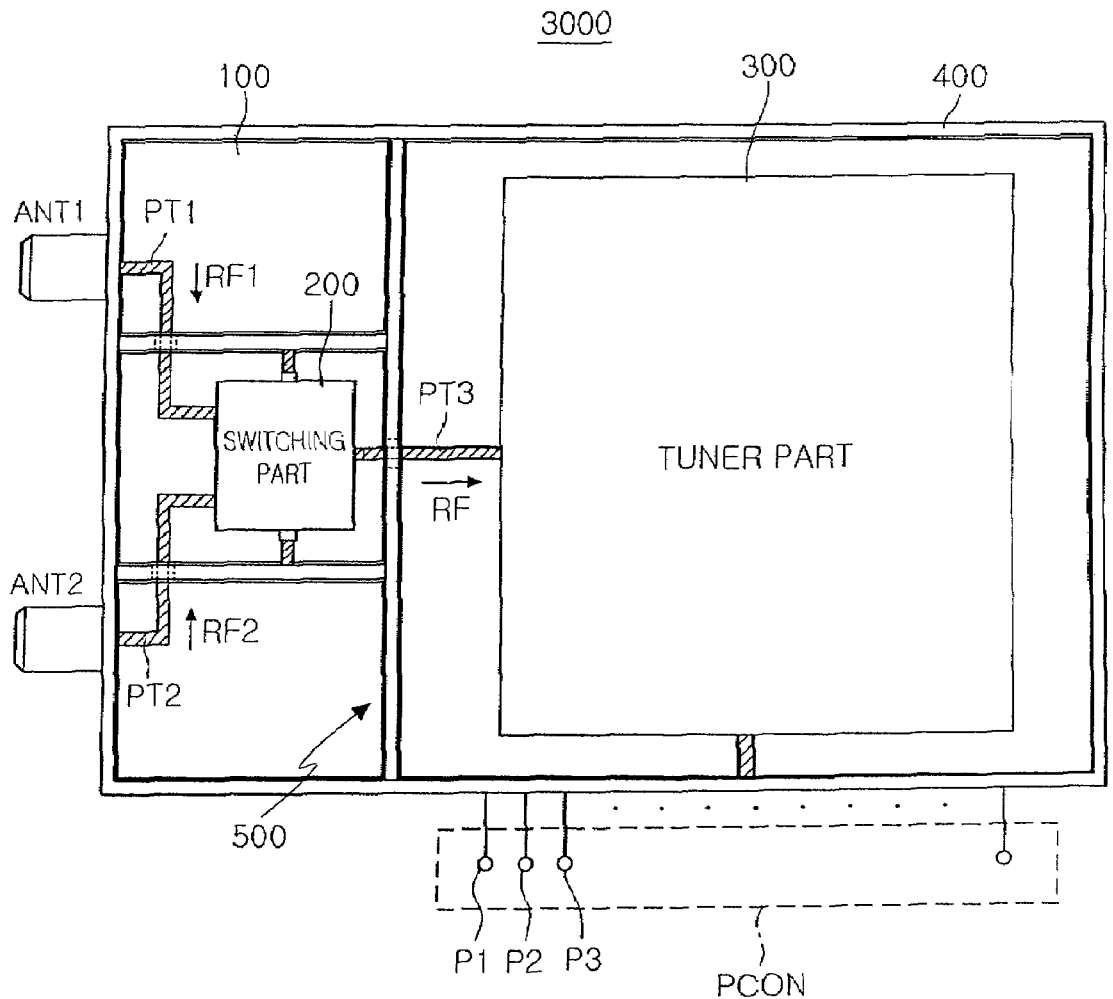
FIG. 2 is a top view of the inside of a television tuning apparatus according to an exemplary embodiment of the present invention.

FIG. 2 is a top view of the inside of a television tuning apparatus 3000 according to an exemplary embodiment of the present invention. Referring to FIG. 2, the television tuning apparatus 3000 includes a PCB (PCB)100; a switching part 200 installed on the PCB 100 and selecting one of a first radio frequency (RF) signal RF1 and a second RF signal RF2 inputted; a tuner part 300 installed on the PCB 100 and down-converting one of the first RF signal RF1 and the second RF signal RF2, the one selected by the switching part 200; first and second input connectors ANT1 and ANT2 receiving the first RF signal RF1 and the second RF signal RF2; and a chassis 400 supporting the first and second input connectors ANT1 and ANT2, covering the PCB 100, the switching part 200, and the tuner part 300, and electrically connected to grounds of the switching part 200 and the tuner part 300.

Also, the apparatus 3000 may include a shielding wall 500 connected to the chassis 400 to shield the switching part 200 from a signal interference with at least one element of other elements connected to the PCB 100.

The apparatus 3000 may further include a switching terminal receiving and transmitting a switching signal to the switching part 200. The switching terminal may be formed of a pin connector PCON described below.

Referring to FIG. 2, the pin connector PCON is a pin type connector for receiving a selection signal for selecting one of the first RF signal RF1 and the second RF signal RF2. The pin connector PCON includes a power pin P1 receiving and transferring a tuning operation power to the tuner part 300; a control data pin P2 receiving and transferring control data including a channel selection signal and the input selection signal for selecting one of the first RF signal RF1 and the second RF signal RF2, to the tuner part 300; and a signal output pin P3 outputting a signal from the tuner part 300.

For example, the control data pin P2 may be formed of a clock signal pin CL for inputting a clock signal and a data pin DA for inputting the control data.

Figure 3:
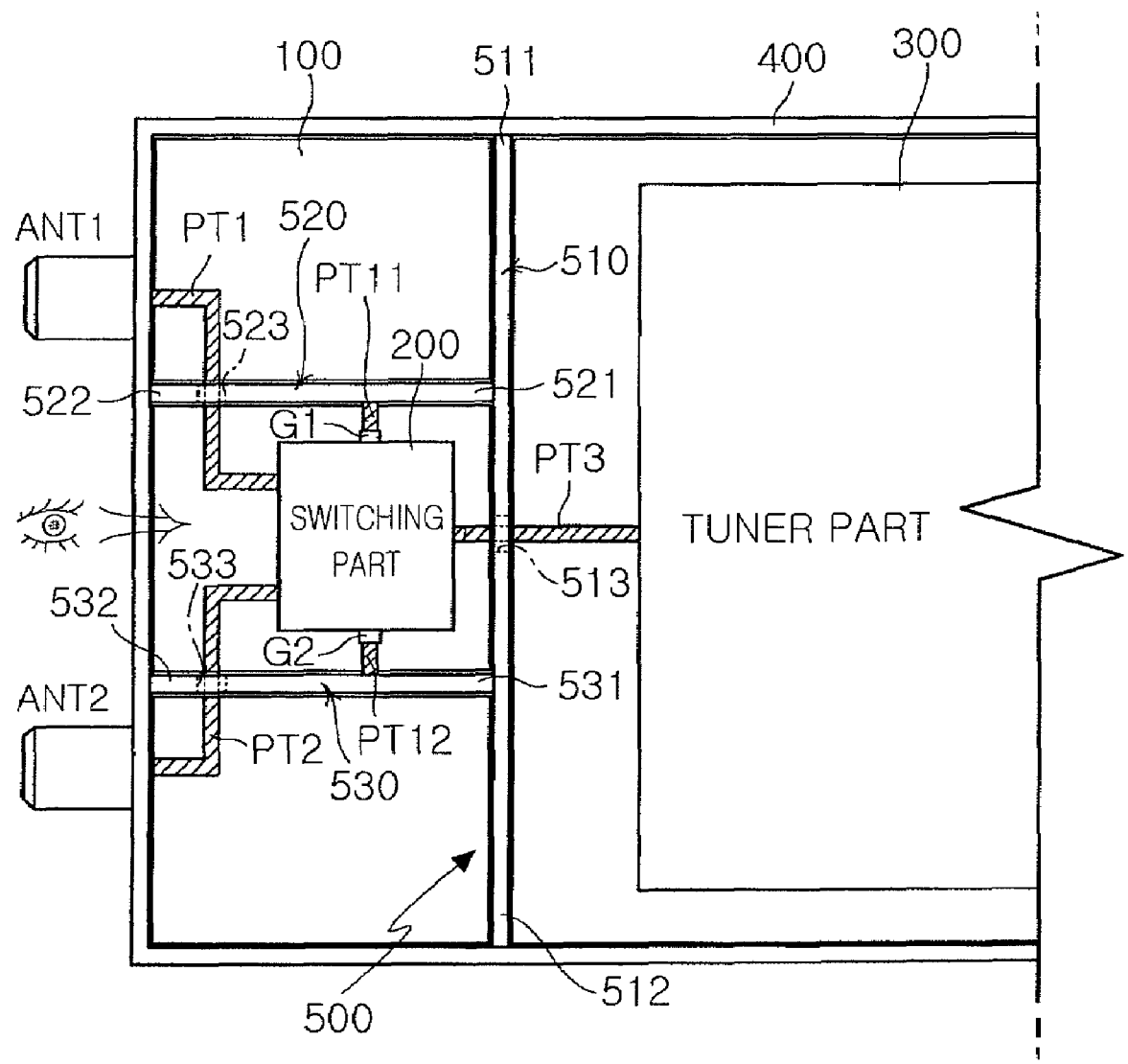
FIG. 3 is a detailed configuration diagram illustrating a shielding wall according to an exemplary embodiment of the present invention.
Figure 4:
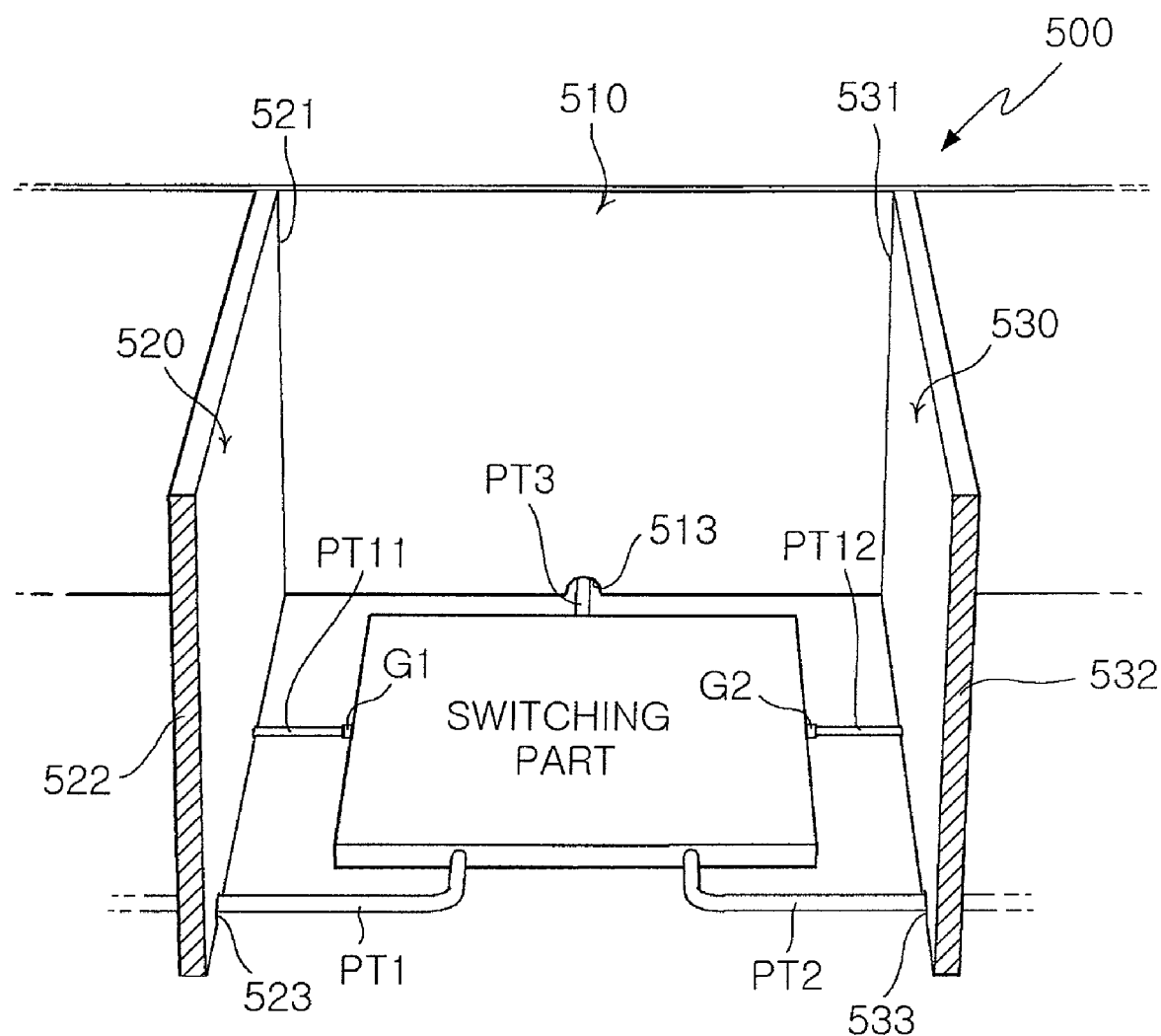
FIG. 4 is a partial perspective view illustrating a pattern-passing groove according to an exemplary embodiment of the present invention.

FIG. 3 is a detailed configuration diagram illustrating the shielding wall 500 according to an exemplary embodiment of the present invention, and FIG. 4 is a partial perspective view illustrating a pattern-passing groove according to an exemplary embodiment of the present invention.

Referring to FIGS. 2 through 4, the shielding wall 500 may be connected to grounds G1 and G2 of the switching part 200 via connection patterns PT 11 and PT 12 formed on the PCB 100.

The shielding wall 500 includes a first shielding wall 510 insulating the switching part 200 from the tuner part 300, a second shielding wall 520 insulating the switching part 200 from the first input connector ANT1, and a third shielding wall 530 insulating the switching part 200 from the second input connector ANT2.

Referring to FIGS. 2 and 3, a connection pattern PT1 is a first connection pattern connecting the switching part 200 to the first input connector ANT1, a connection pattern PT2 is a second connection pattern connecting the switching part 200 to the second input connector ANT2, and a connection pattern PT3 is an intermediate connection pattern connecting the switching part 200 to the tuner part 300.

Referring to FIGS. 3 and 4, the first shielding wall 510 includes a one end 511 connected to a lengthwise first inner surface of the chassis 400; an another end 512 connected to a second inner surface opposite to the first inner surface; and a pattern-passing groove 513 formed concavely in an area contacted with the PCT 100, through which the intermediate connection pattern PT3 connecting the switching part 200 to the tuner part 300 passes, to allow the intermediate connection pattern PT3 to pass.

In this case, referring to FIG. 4, the pattern-passing groove 513 provides a path for allowing the intermediate connection pattern PT3 to pass without an electrical contact, thereby preventing an electrical connection between the intermediate connection pattern PT3 and the first shielding wall 510.

Also, the second shielding wall 520 includes a one end 521 connected to the first shielding wall 510; an another end 522 connected to a widthwise third inner surface of the chassis 400, in which the third inner surface connects the first inner surface to the second inner surface of the chassis 400; and a pattern-passing groove 523 formed concavely in an area contacted with the PCT 100, through which the first connection pattern PT1 connecting the switching part 200 to the first input connector ANT1 passes, to allow the first connection pattern PT1 to pass.

In this case, the pattern-passing groove 523 provides a path for allowing the first connection pattern PT1 to pass without an electrical contact, thereby preventing an electrical connection between the first connection pattern PT1 and the second shielding wall 520.

The second shielding wall 530 a one end 531 connected to the first shielding wall 510; an another end 532 connected to the third inner surface; and a pattern passing groove 533 formed concavely in an area contacted with the PCT 100, through which the second connection pattern PT2 connecting the switching part 200 to the second input connector ANT2 passes, to allow the second connection pattern PT2 to pass.

In this case, Referring to FIG. 4, the pattern-passing groove 533 provides a path for allowing the second connection pattern PT2 to pass without an electrical contact, thereby preventing an electrical connection between the second connection pattern PT2 and the third shielding wall 530.

Figure 5:
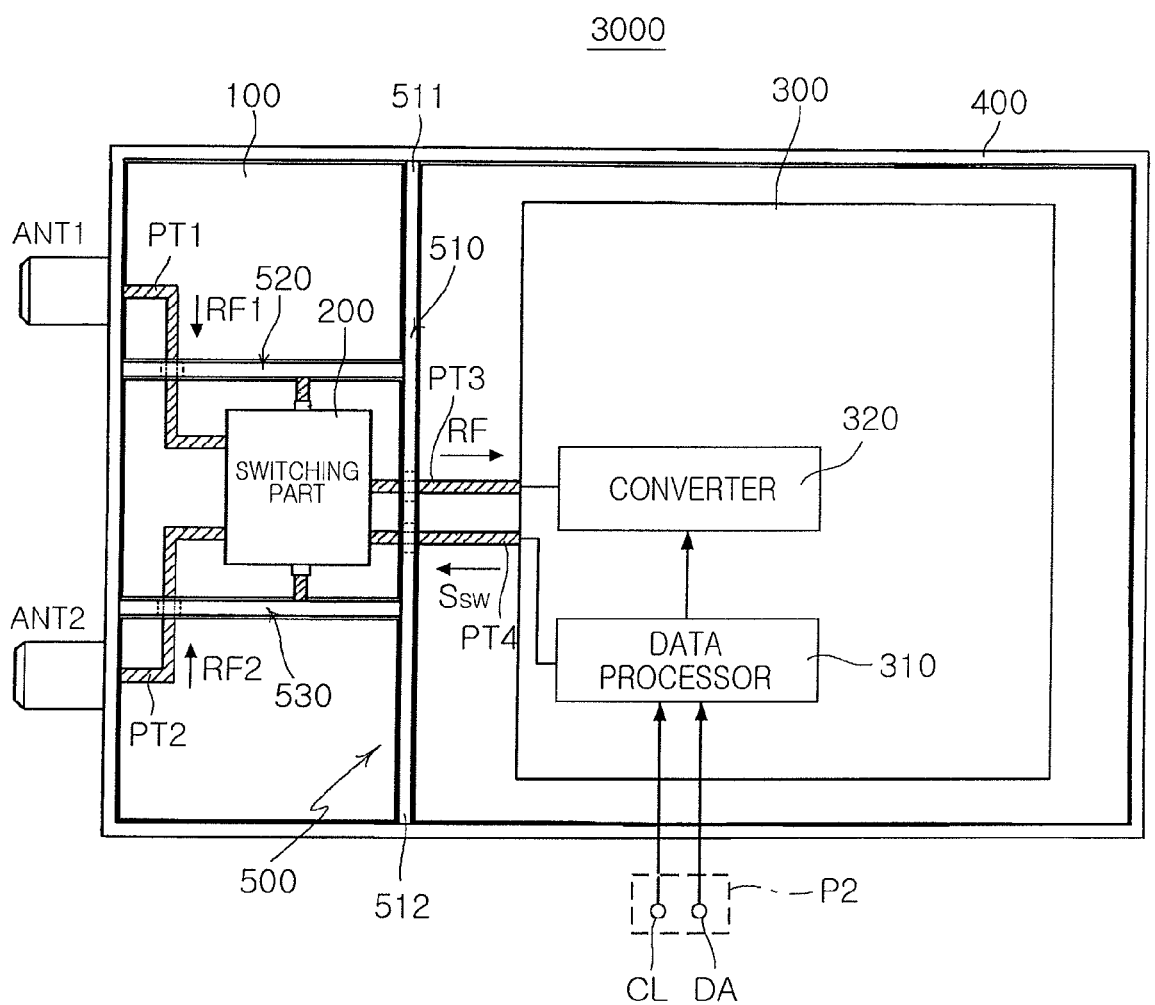
FIG. 5 is a configuration diagram illustrating a tuner part according to an exemplary embodiment of the present invention.

FIG. 5 is a configuration diagram illustrating a tuner part according to an exemplary embodiment of the present invention.

Referring to FIG. 5, the tuner part 300 includes a data processor 310 analyzing the channel selection signal and the input selection signal included in the control data received via the control data pin P2, outputting a channel control signal according to the channel selection signal, and transmitting a switching signal to the switching part 200 according to the input selection signal; and a converter 320 down-converting an RF signal from the switching part 200 according to the channel control signal from the data processor 310.

Referring to FIGS. 2 through 5, the control data pin P2 may be comprised of a clock signal pin CL for inputting a clock signal and a data pin DA for inputting the control data.

In this case, the data processor 310 is connected to the switching part 200 via an individual connection pattern PT4. In order to allow the connection pattern PT4, the first shielding wall 510 may further include a pattern-passing groove 514 concavely formed in an area contacted with the PCT 100, through which the connection pattern PT4 connecting the switching part 200 to the tuner part 300 passes.

Figure 6:
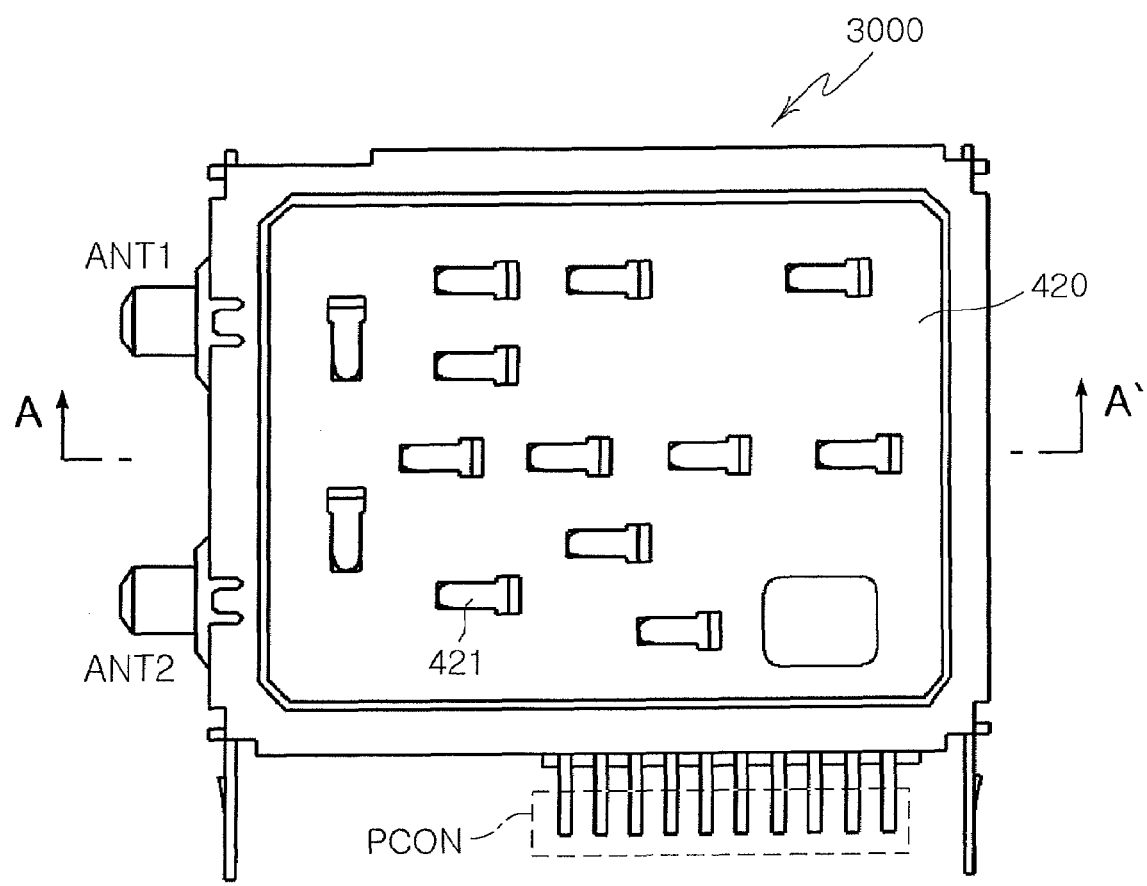
FIG. 6 is an external view illustrating a television tuning apparatus according to an exemplary embodiment of the present invention.
Figure 7:
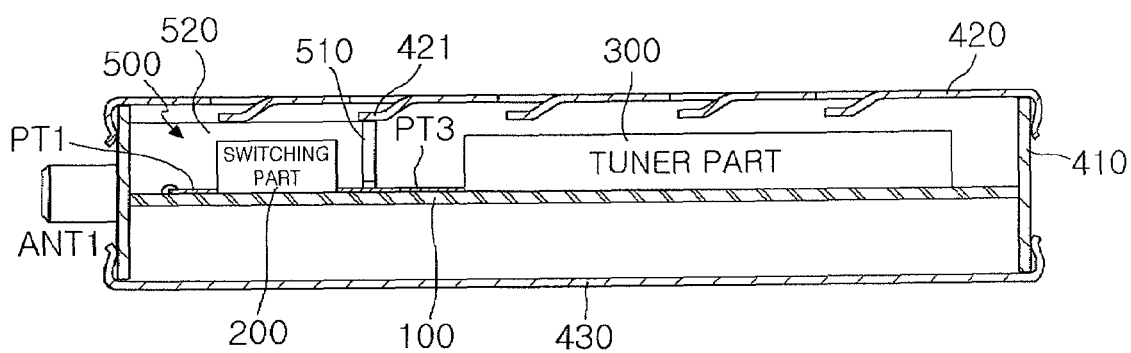
FIG. 7 is a cross-section cut along a line A-A' shown in FIG. 6 to illustrate a first installation example of the television tuning apparatus of FIG. 6.
Figure 8:
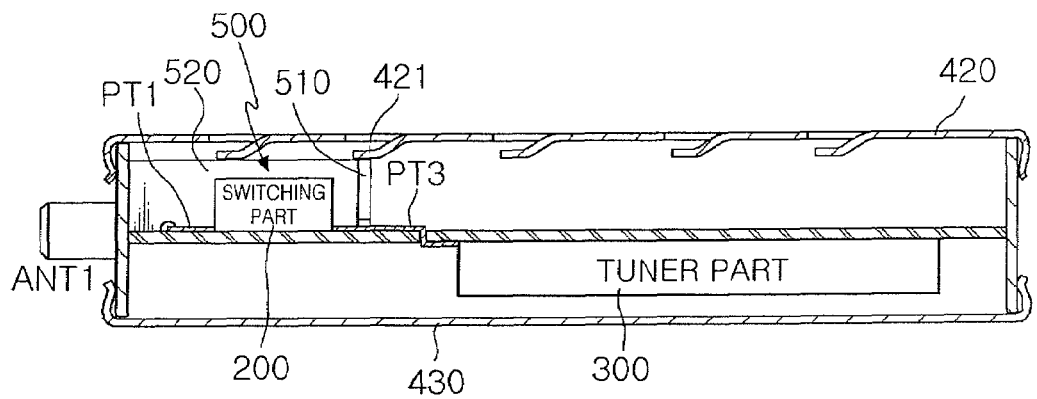
FIG. 8 is a cross-section cut along a line A-A' shown in FIG. 6 to illustrate a second installation example of the television tuning apparatus of FIG. 6.

FIG. 6 is an external view illustrating a television tuning apparatus 3000 according to an exemplary embodiment of the present invention, FIG. 7 is a cross-section cut along a line A-A' shown in FIG. 6 to illustrate a first installation example of the television tuning apparatus of FIG. 6, and FIG. 8 is a cross-section cut along a line A-A' shown in FIG. 6 to illustrate a second installation example of the television tuning apparatus of FIG. 6.

Referring to FIGS. 6 through 8, the chassis 400 includes a body chassis 410 coupled with the PCB 100 and covering sides of the PCB 100 to protect the sides of the PCB 100; a first cover chassis 420 coupled with the body chassis 410 and covering an exposed portion of a one surface of the PCB 100 to protect the one surface of the PCB 100; and a second cover chassis 430 coupled with the body chassis 410 and covering an exposed portion of another surface of the PCB 100, the another surface opposite to the one surface, to protect the another surface of the PCB 100.

The body chassis 410 is coupled with an edge portion of the PCB 100 in the shape of a general square. For example, the body chassis 410 is formed in a square-shaped frame structure including a plurality of coupling protrusions formed on a lower portion thereof to be inserted into a coupling groove formed on the edge portion of the PCB 100 to couple the PCB 100 with the body chassis 410. As described above, a general coupler for coupling the PCB 100 with the body chassis may be employed.

Referring to FIG. 7, the switching part 200 may be formed on one surface of the PCB 100 and the tuner part 300 may be formed on the one surface together with the switching part 200. In this case, the PCB 100 may be formed of a one-side substrate.

Referring to FIG. 8, the switching part 200 may be formed on one surface of the PCB 100 and the tuner part 300 may be formed on another surface of the PCB 100. In this case, the PCB 100 may be formed of a double-sided substrate.

Also, in FIGS. 6 through 8, the PCB 100 may be formed of a multi substrate. Referring to FIGS. 6 through 8, a portion of the first cover chassis 420 includes a plurality of touch pointers 421. When coupling the first cover chassis 420 with the body chassis 410, the touch pointers 421 may be formed to be contacted with the shielding wall 500.

Figure 9:
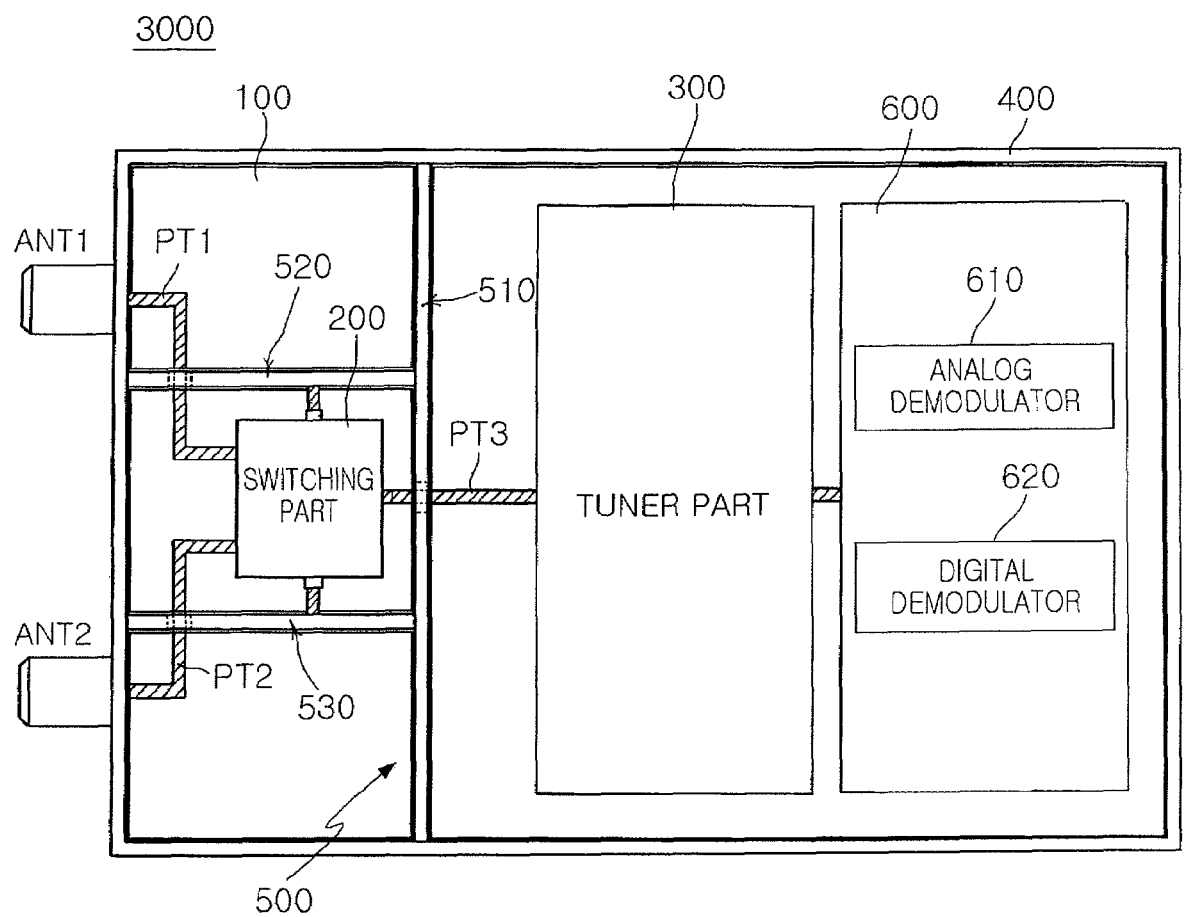
FIG. 9 is a configuration diagram illustrating a television tuning apparatus according to an exemplary embodiment of the present invention.

FIG. 9 is a configuration diagram illustrating a television tuning apparatus 3000 according to an exemplary embodiment of the present invention.

Referring to FIG. 9, the apparatus 3000 may include a demodulating part 600 demodulating a signal from the tuner part 300.

In this case, the demodulating part 600 includes an analog demodulator 610 demodulating the first RF signal RF1 and a digital demodulator 620 demodulating the second RF signal RF2.

In this case, the first RF signal RF1 is an RF signal for analog broadcasting and the second RF signal RF2 is an RF signal for digital broadcasting.

As described above, the apparatus 3000 may be employed by a television receiver. Hereinafter, the television receiver will be described with reference to FIG. 10.

Figure 10:
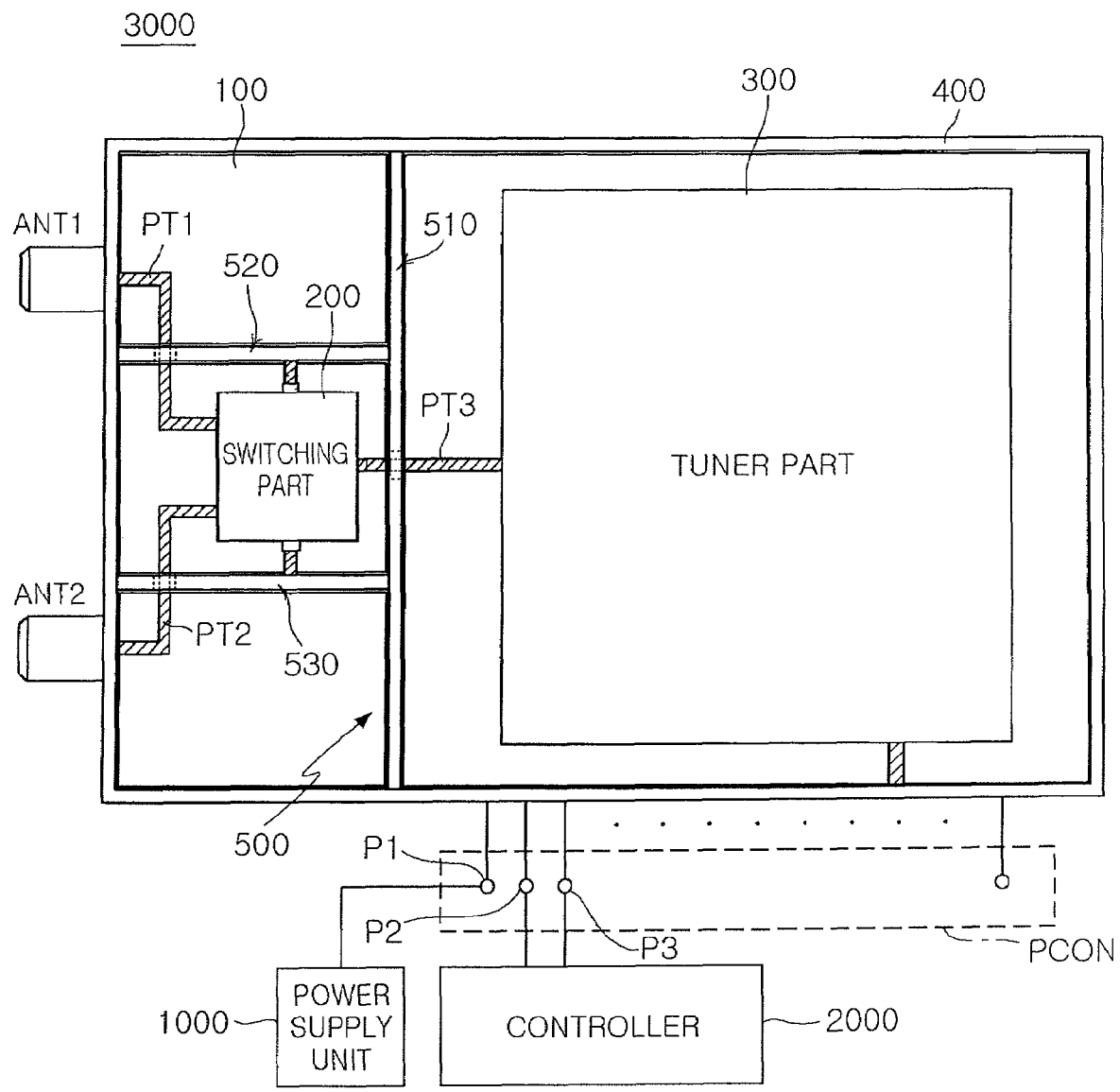
FIG. 10 is a block diagram illustrating a television receiver according to an exemplary embodiment of the present invention.

FIG. 10 is a block diagram illustrating a television receiver according to an exemplary embodiment of the present invention.

Referring to FIG. 10, the television receiver according to an exemplary embodiment of the present invention includes a power supply unit 1000 supplying a voltage for operation; a controller 2000 providing control data including a channel selection signal and an input selection signal; and the television tuning apparatus 3000 formed of one chassis, the apparatus 3000 receiving the voltage for operation from the power supply unit 1000, and down-converting one of a first RF signal RF1 and a second RF signal RF2 according to the input selection signal included in the control data from the controller 2000.

The configuration of the apparatus 3000 has been described above and the detailed description of the configuration will be omitted.

Hereinafter, operations and effects of the present invention will be described in detail with reference to the attached drawings.

Referring to FIGS. 2 through 9, in the apparatus 3000 shown in FIG. 2, the switching part 200 installed on the PCB 100 selects and outputs one of the first RF signal RF1 and the second RF signal RF2 to the tuner part 300.

In this case, the first RF signal RF1 is inputted via the first input connector ANT1 supported by the chassis 400 and the second RF signal RF2 is inputted via the second input connector ANT2 supported by the chassis 400.

The tuner part 300 down-converts an RF signal from the switching part 200 into an IF signal and outputs the IF signal.

In this case, since the chassis 400 covers the PCB 100, the switching part 200, and the tuner part 300, the PCB 100, the switching part 200, and the tuner part 300 may be protected from an external impact. Also, since the chassis 400 is electrically connected to grounds of the switching part 200 and the tuner part 300, an unnecessary signal inflow between the inside and the outside of the apparatus 3000 may be prevented.

In addition, the shielding wall 500 connected to the chassis 400 shields the switching part 200 from a signal interference with at least one of other elements connected to the PCB 100, thereby insulating the switching part 200 from the other elements connected to the PCB 100.

On the other hand, the apparatus 3000 may receive a switching signal via a switching terminal and provide the switching signal to the switching part 200. In this case, the switching part 200 may select one of the first RF signal RF1 and the second RF signal RF2 according to the switching signal.

The switching terminal may be formed of a pin connector PCON that will be described below.

For example, when the pin connector PCON includes a power pin P1, a control data pin P2, and a signal output pin P3, the apparatus 3000 receives a voltage for operation of the tuner part 300 via the power pin P1 of the pin connector PCON and receives control data including a channel selection signal and an input selection signal for selecting one of the first RF signal RF1 and the second RF signal RF2 via the control data pin P2 of the pin connector PCON. In this case, the control data is provided to the tuner part 300.

The apparatus 3000 outputs a signal from the tuner part 300 via the signal output pin P3 of the pin connector PCON.

Referring to FIGS. 2 through 4, since the shielding wall 500 is connected to grounds G1 and G2 of the switching part 200 via connection patterns PT11 and PT12 formed on the PCB 100, signal absorption of the shielding wall 500 is improved to strongly bypass a signal causing an interference to the ground, thereby more improving the shielding performance.

In detail, when the shielding wall 500 includes a first shielding wall 510 insulating the switching part 200 from the tuner part 300, a second shielding wall 520 insulating the switching part 200 from the first input connector ANT1, and a third shielding wall 530 insulating the switching part 200 from the second input connector ANT2, the first shielding wall 510 shields the switching part 200 from the tuner part 300, the second shielding wall 520 shields the switching part 200 from the first input connector ANT1, and the third shielding wall 530 shields the switching part 200 from the second input connector ANT2.

On the other hand, as shown in FIG. 5, when the tuner part 300 includes a data processor 310 and a converter 320, the data processor 310 analyzes a channel selection signal and an input selection signal included in the control data received via the control data pin P2, outputs a channel control signal according to the channel selection signal, and transmits a switching signal to the switching part 200 according to the input selection signal. The converter 320 down-converts an RF signal from the switching signal according to the channel control signal from the data processor 310.

Referring to FIG. 9, the first RF signal RF1 may correspond to an RF signal for analog broadcasting and the second RF signal RF2 may correspond to an RF signal for digital broadcasting. In association with this, when the apparatus 3000 includes a demodulating part 600 including an analog demodulator 610 and a digital demodulator 620, the analog demodulator 610 may demodulate the first RF signal RF1 that is the RF signal for analog broadcasting and the digital demodulator 620 may demodulate the second RF signal RF2 that is the RF signal for digital broadcasting.

As described above, the apparatus 3000 may be employed by a television receiver that will be described referring to FIG. 10.

Referring to FIG. 10, in the receiver according to an exemplary embodiment of the present invention, a power supply unit 1000 may supply a voltage for operation to the apparatus 3000 via a pin connector PCON. The controller 2000 may transfer control data including a channel selection signal and an input selection signal to the apparatus 3000.

Accordingly, the apparatus 3000 may receive the voltage from the power supply unit 1000 and may select and down-convert one of the first RF signal RF1 and the second RF signal RF2 according to the input selection signal included in the control data transferred from the controller 2000.

As described above, an aspect of the present invention provides a single package television tuning apparatus including a switching part for selecting multi input and a tuner part installed together on one chassis and shielding the switching part form other elements to prevent a signal interference between the switching part and the other elements and to carry out size reduction and a low price and a television receiver including the apparatus.

While the present invention has been shown and described in connection with the exemplary embodiments, it will be apparent to those skilled in the art that modifications and variations can be made without departing from the spirit and scope of the invention as defined by the appended claims.

What is claimed is:

1. A single package television tuning apparatus comprising:
   a printed circuit board;
   a switching part installed on the printed circuit board and selecting one of a first radio frequency signal and a second radio frequency signal inputted;
   a tuner part installed on the printed circuit board and down-converting one of the first radio frequency signal and the second radio frequency signal, the one selected by the switching part;
   first and second input connectors receiving the first radio frequency signal and the second radio frequency signal; and
   a chassis supporting the first and second input connectors, covering the printed circuit board, the switching part, and the tuner part, and electrically connected to grounds of the switching part and the tuner part.

2. The apparatus of claim 1, further comprising a shielding wall connected to the chassis to shield the switching part from a signal interference with at least one element of other elements connected to the printed circuit board.

3. The apparatus of claim 2, wherein the shielding wall is connected to grounds of the switching part.

4. The apparatus of claim 2, wherein the shielding wall comprises a first shielding wall insulating the switching part from the tuner part.

5. The apparatus of claim 4, wherein the shielding wall further comprises:
   a second shielding wall insulating the switching part from the first input connector; and
   a third shielding wall insulating the switching part from the second input connector.

6. The apparatus of claim 5, wherein the first shielding wall comprises:
   a one end connected to a lengthwise first inner surface of the chassis;
   an another end connected to a second inner surface opposite to the first inner surface; and
   a pattern-passing groove formed concavely in an area contacted with the PCT 100, through which an intermediate connection pattern connecting the switching part to the tuner part passes, to allow the intermediate connection pattern to pass.

7. The apparatus of claim 6, wherein the second shielding wall comprises:
   a one end connected to the first shielding wall;
   an another end connected to a widthwise third inner surface of the chassis, the third inner surface connecting the first inner surface to the second inner surface of the chassis; and
   a pattern-passing groove formed concavely in an area contacted with the PCT 100, through which a first connection pattern connecting the switching part to the first input connector passes, to allow the first connection pattern to pass.

8. The apparatus of claim 7, wherein the third shielding wall comprises:
   a one end connected to the first shielding wall;
   an another end connected to the third inner surface; and
   a pattern passing groove formed concavely in an area contacted with the PCT 100, through which a second connection pattern connecting the switching part to the second input connector passes, to allow the second connection pattern to pass.

9. The apparatus of claim 2, wherein the chassis comprises:
   a body chassis coupled with the printed circuit board and covering sides of the printed circuit board to protect the sides of the printed circuit board;
   a first cover chassis coupled with the body chassis and covering an exposed portion of a one surface of the printed circuit board to protect the one surface of the printed circuit board; and
   a second cover chassis coupled with the body chassis and covering an exposed portion of another surface of the printed circuit board, the another surface opposite to the one surface, to protect the another surface of the printed circuit board.

10. The apparatus of claim 9, wherein the switching part is formed on the one surface of the printed circuit board, and
   the tuner part is formed together with the switching part on the one surface of the printed circuit board.

11. The apparatus of claim 10, wherein the first cover chassis comprises a plurality of touch pointers whose part is formed convexly toward the shielding wall,
   wherein the touch pointer is contacted with the shielding wall when the first cover chassis is coupled with the body chassis.

12. The apparatus of claim 9, wherein the switching part is formed on the one surface of the printed circuit board, and
   the tuner part is formed on the another surface of the printed circuit board.

13. The apparatus of claim 12, wherein the first cover chassis comprises a plurality of touch pointers whose part is formed convexly toward the shielding wall,
   wherein the touch pointer is contacted with the shielding wall when the first cover chassis is coupled with the body chassis.

14. The apparatus of claim 2, further comprising a switching terminal receiving and transmitting a switching signal to the switching part.

15. A single package television tuning apparatus comprising:
   a printed circuit board;
   a switching part installed on the printed circuit board and selecting one of a first radio frequency signal and a second radio frequency signal;
   a tuner part installed on the printed circuit board and down-converting one of the first radio frequency signal and the second radio frequency signal, the one selected by the switching part;
   first and second input connectors receiving the first radio frequency signal and the second radio frequency signal;
   a chassis supporting the first and second input connectors, covering the printed circuit board, the switching part, and the tuner part, and electrically connected to grounds of the switching part and the tuner part;
   a shielding wall connected to the chassis to shield the switching part from a signal interference with at least one element of other elements connected to the printed circuit board; and
   a pin connector receiving an input selection signal for selecting one of the first radio frequency signal and the second radio frequency signal.

16. The apparatus of claim 15, wherein the pin connector comprises:
   a power pin receiving and transferring a tuning operation power to the tuner part;
   a control data pin receiving and transferring control data including a channel selection signal and the input selection signal for selecting one of the first radio frequency signal and the second radio frequency signal, to the tuner part; and
a signal output pin outputting a signal from the tuner part.

17. The apparatus of claim 16, wherein the tuner part comprises:
a data processor analyzing the channel selection signal and the input selection signal included in the control data received via the control data pin, outputting a channel control signal according to the channel selection signal, and transmitting a switching signal to the switching part according to the input selection signal; and
a converter down-converting a radio frequency signal from the switching part according to the channel control signal from the data processor.

18. The apparatus of claim 17, wherein the shielding wall is connected to grounds of the switching part.

19. The apparatus of claim 17, wherein the shielding wall comprises a first shielding wall insulating the switching part from the tuner part.

20. The apparatus of claim 19, wherein the shielding wall further comprises:
a second shielding wall insulating the switching part from the first input connector; and
a third shielding wall insulating the switching part from the second input connector.

21. The apparatus of claim 20, wherein the first shielding wall comprises:
a one end connected to a lengthwise first inner surface of the chassis;
an another end connected to a second inner surface opposite to the first inner surface; and
a pattern-passing groove formed concavely in an area contacted with the PCT 100, through which an intermediate connection pattern connecting the switching part to the tuner part passes, to allow the intermediate connection pattern to pass.

22. The apparatus of claim 21, wherein the second shielding wall comprises:
a one end connected to the first shielding wall;
an another end connected to a widthwise third inner surface of the chassis, the third inner surface connecting the first inner surface to the second inner surface of the chassis; and
a pattern-passing groove formed concavely in an area contacted with the PCT 100, through which a first connection pattern connecting the switching part to the first input connector passes, to allow the first connection pattern to pass.

23. The apparatus of claim 22, wherein the third shielding wall comprises:
a one end connected to the first shielding wall;
an another end connected to the third inner surface; and
a pattern passing groove formed concavely in an area contacted with the PCT 100, through which a second connection pattern connecting the switching part to the second input connector passes, to allow the second connection pattern to pass.

24. The apparatus of claim 17, further comprising a demodulating part demodulating the signal from the tuner part.

25. The apparatus of claim 24, wherein the demodulating part comprises:
an analog demodulator demodulating the first radio frequency signal; and
a digital demodulator demodulating the second radio frequency signal,
wherein the first radio frequency signal is for analog broadcasting and the second radio frequency signal is for digital broadcasting.

26. The apparatus of claim 15, wherein the chassis comprises:
a body chassis coupled with the printed circuit board and covering sides of the printed circuit board to protect the sides of the printed circuit board;
a first cover chassis coupled with the body chassis and covering an exposed portion of a one surface of the printed circuit board to protect the one surface of the printed circuit board; and
a second cover chassis coupled with the body chassis and covering an exposed portion of another surface of the printed circuit board, the another surface opposite to the one surface, to protect the another surface of the printed circuit board.

27. The apparatus of claim 26, wherein the switching part is formed on the one surface of the printed circuit board, and
the tuner part is formed together with the switching part on the one surface of the printed circuit board.

28. The apparatus of claim 27, wherein the first cover chassis comprises a plurality of touch pointers whose part is formed convexly toward the shielding wall,
wherein the touch pointer is contacted with the shielding wall when the first cover chassis is coupled with the body chassis.

29. The apparatus of claim 26, wherein the switching part is formed on the one surface of the printed circuit board, and
the tuner part is formed on the another surface of the printed circuit board.

30. The apparatus of claim 29, wherein the first cover chassis comprises a plurality of touch pointers whose part is formed convexly toward the shielding wall,
wherein the touch pointer is contacted with the shielding wall when the first cover chassis is coupled with the body chassis.

31. A television receiver comprising:
a power supply unit supplying a voltage for operation;
a controller providing control data including a channel selection signal and an input selection signal; and
a television tuning apparatus formed of one chassis, the apparatus receiving the voltage for operation from the power supply unit, and down-converting one of a first radio frequency signal and a second radio frequency signal according to the input selection signal included in the control data from the controller,
wherein the apparatus comprises a printed circuit board; a switching part installed on the printed circuit board and selecting one of the first radio frequency signal and the second radio frequency signal inputted; a tuner part installed on the printed circuit board and down-converting one of the first radio frequency signal and the second radio frequency signal, the one selected by the switching part; first and second input connectors receiving the first radio frequency signal and the second radio frequency signal; and a chassis supporting the first and second input connectors, covering the printed circuit board, the switching part, and the tuner part, and electrically connected to grounds of the switching part and the tuner part.

32. The receiver of claim 31, further comprising a shielding wall connected to the chassis to shield the switching part from a signal interference with at least one element of other elements connected to the printed circuit board.

33. The receiver of claim 32, further comprising a pin connector receiving the input selection signal for selecting one of the first radio frequency signal and the second radio frequency signal.

34. The receiver of claim 33, wherein the pin connector comprises:
   a power pin receiving and transferring a tuning operation power to the tuner part;
   a control data pin receiving and transferring the control data including the channel selection signal and the input selection signal for selecting one of the first radio frequency signal and the second radio frequency signal, to the tuner part; and
   a signal output pin outputting a signal from the tuner part.

35. The receiver of claim 34, wherein the tuner part comprises:
   a data processor analyzing the channel selection signal and the input selection signal included in the control data received via the control data pin, outputting a channel control signal according to the channel selection signal, and transmitting a switching signal to the switching part according to the input selection signal; and
   a converter down-converting a radio frequency signal from the switching part according to the channel control signal from the data processor.

36. The receiver of claim 35, wherein the shielding wall is connected to grounds of the switching part.

37. The receiver of claim 35, wherein the shielding wall comprises a first shielding wall insulating the switching part from the tuner part.

38. The receiver of claim 37, wherein the shielding wall further comprises:
   a second shielding wall insulating the switching part from the first input connector; and
   a third shielding wall insulating the switching part from the second input connector.

39. The receiver of claim 38, wherein the first shielding wall comprises:
   a one end connected to a lengthwise first inner surface of the chassis;
   an another end connected to a second inner surface opposite to the first inner surface; and
   a pattern-passing groove formed concavely in an area contacted with the PCT 100, through which an intermediate connection pattern connecting the switching part to the tuner part passes, to allow the intermediate connection pattern to pass.

40. The receiver of claim 39, wherein the second shielding wall comprises:
   a one end connected to the first shielding wall;
   an another end and connected to a widthwise third inner surface of the chassis, the third inner surface connecting the first inner surface to the second inner surface of the chassis; and
   a pattern-passing groove formed concavely in an area contacted with the PCT 100, through which a first connection pattern connecting the switching part to the first input connector passes, to allow the first connection pattern to pass.

41. The receiver of claim 40, wherein the third shielding wall comprises:
   a one end connected to the first shielding wall;
   an another end connected to the third inner surface; and
   a pattern passing groove formed concavely in an area contacted with the PCT 100, through which a second connection pattern connecting the switching part to the second input connector passes, to allow the second connection pattern to pass.

42. The receiver of claim 41, wherein the switching part is formed on the one surface of the printed circuit board, and
   the tuner part is formed on the another surface of the printed circuit board.

43. The receiver of claim 42, wherein the first cover chassis comprises a plurality of touch pointers whose part is formed convexly toward the shielding wall,
   wherein the touch pointer is contacted with the shielding wall when the first cover chassis is coupled with the body chassis.

44. The receiver of claim 32, wherein the chassis comprises:
   a body chassis coupled with the printed circuit board and covering sides of the printed circuit board to protect the sides of the printed circuit board;
   a first cover chassis coupled with the body chassis and covering an exposed portion of a one surface of the printed circuit board to protect the one surface of the printed circuit board; and
   a second cover chassis coupled with the body chassis and covering an exposed portion of another surface of the printed circuit board, the another surface opposite to the one surface, to protect the another surface of the printed circuit board.

45. The receiver of claim 44, wherein the switching part is formed on the one surface of the printed circuit board, and
   the tuner part is formed together with the switching part on the one surface of the printed circuit board.

46. The receiver of claim 45, wherein the first cover chassis comprises a plurality of touch pointers whose part is formed convexly toward the shielding wall,
   wherein the touch pointer is contacted with the shielding wall when the first cover chassis is coupled with the body chassis.

* * * * *